Sept. 6, 1966  A. WALZ ETAL  3,271,652
SUPERVISORY BATTERY CHARGER RESPONSIVE TO THE NUMBER
OF CHARGE-DISCHARGE CYCLES
Filed July 9, 1963                                        11 Sheets-Sheet 1

INVENTORS
ALFRED WALZ
ROBERT ÖSTREICHER
BY
McGlew and Toren
ATTORNEYS

INVENTORS
ALFRED WALZ
ROBERT ÖSTREICHER
BY
McGlew and Toren
ATTORNEYS

Sept. 6, 1966

A. WALZ ETAL  3,271,652

SUPERVISORY BATTERY CHARGER RESPONSIVE TO THE NUMBER
OF CHARGE-DISCHARGE CYCLES

Filed July 9, 1963

INVENTORS
ALFRED WALZ
ROBERT OSTREICHER
BY
McGlew and Toren
ATTORNEYS

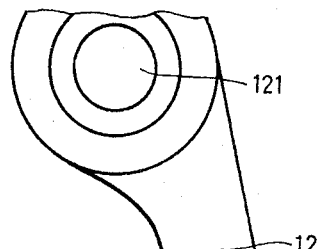
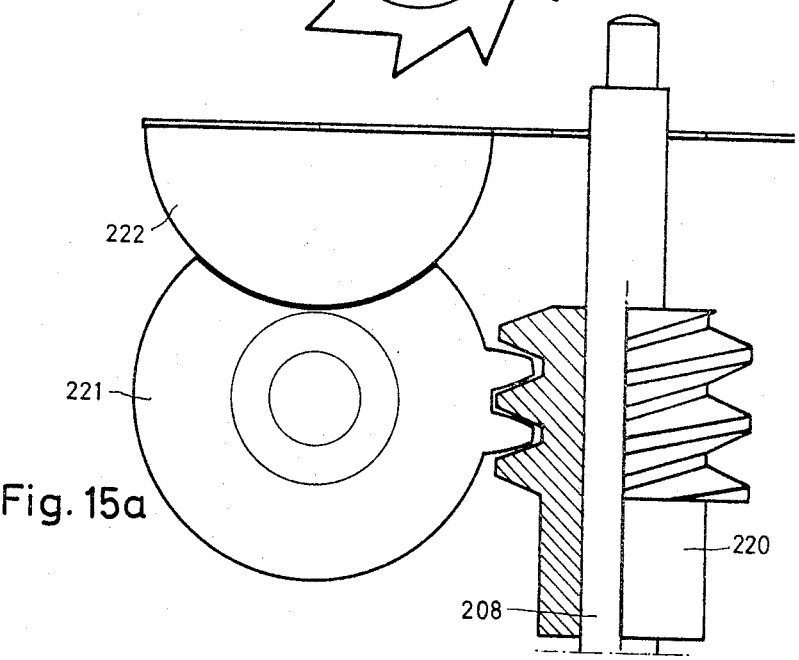
Fig. 11
Fig. 15a

INVENTORS
ALFRED WALZ
ROBERT OSTREICHER
BY
McGlew and Toren
ATTORNEYS

Sept. 6, 1966 A. WALZ ETAL 3,271,652
SUPERVISORY BATTERY CHARGER RESPONSIVE TO THE NUMBER
OF CHARGE-DISCHARGE CYCLES
Filed July 9, 1963 11 Sheets-Sheet 10
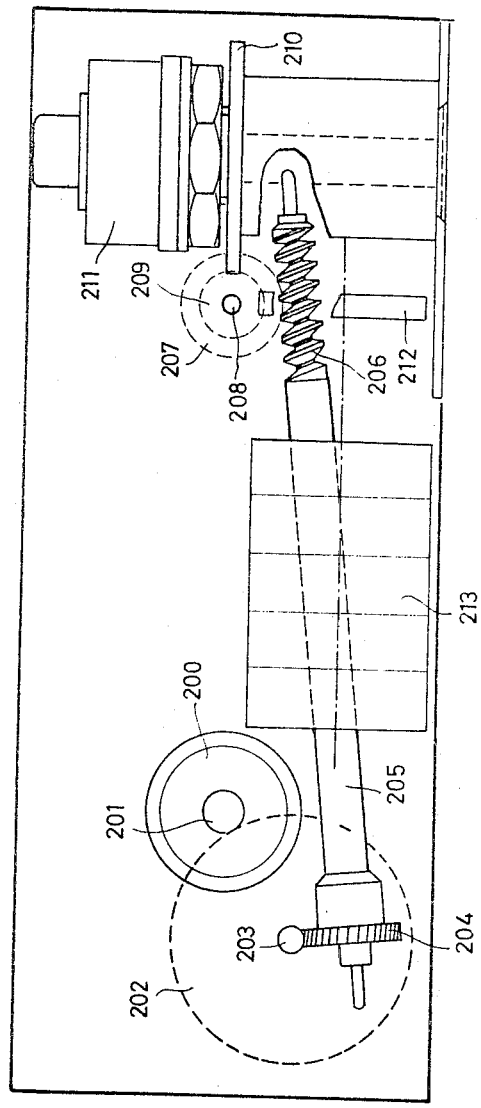
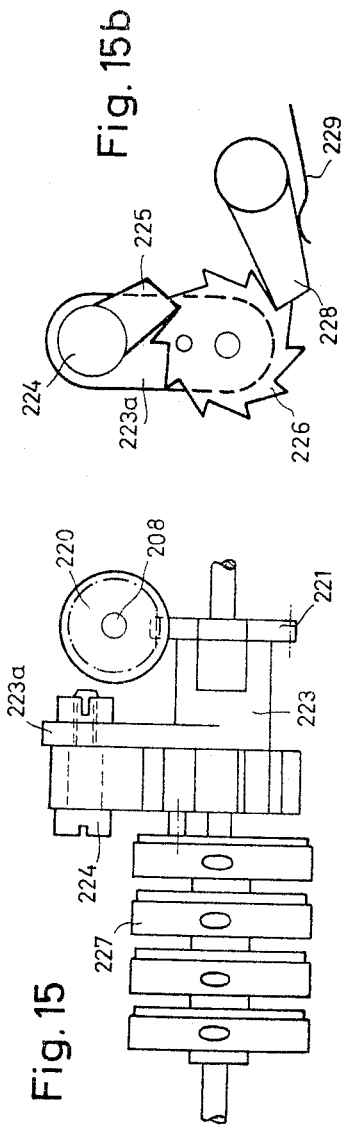
INVENTORS
ALFRED WALZ
ROBERT ÖSTREICHER
BY
McGlew and Toren
ATTORNEYS

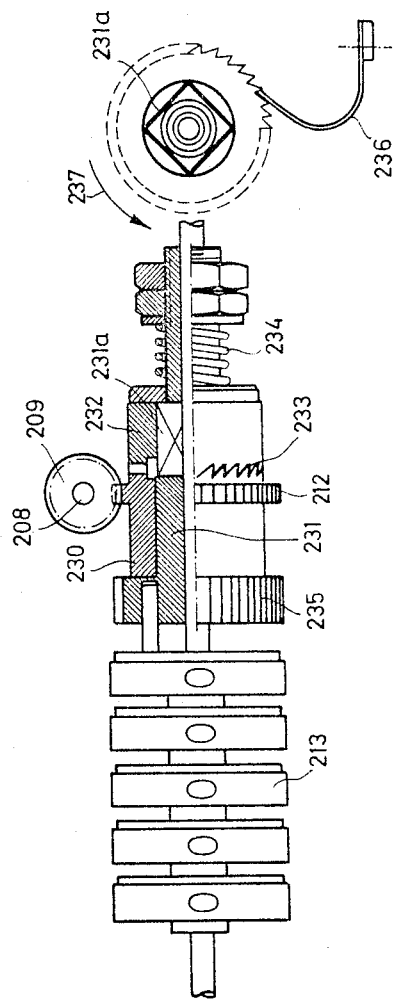

United States Patent Office 3,271,652
Patented Sept. 6, 1966

3,271,652
SUPERVISORY BATTERY CHARGER RESPONSIVE TO THE NUMBER OF CHARGE-DISCHARGE CYCLES
Alfred Walz, Emmendingen, Baden, and Robert Östreicher, Teningen, Baden, Germany, assignors to Messrs. Frako Kondensatoren- und Apparatebau Gesellschaft mit beschrankter Haftung, Teningen, Baden, Germany, a corporation of Germany
Filed July 9, 1963, Ser. No. 293,733
Claims priority, application Germany, July 11, 1962, F 37,293
20 Claims. (Cl. 320—44)

This invention relates to supervisory or monitoring means for the charging current of electrical accumulators such as storage batteries and, more particularly, to an improved charging current supervisory device including a charge measuring arrangement whose speed of operation is automatically changed in accordance with the number of charge-discharge cycles to which the accumulator or storage battery has been subjected.

Charge measuring arrangements for storage batteries are usually in the form of ampere hour measuring devices. However, the capacity of lead batteries decreases with the number of charge-discharge cycles to which the battery has been subjected, with the exception of a small increase in capacity at the time the storage battery is initially used. As a result, an ampere hour counter for indicating the charge of the battery does not correctly indicate the charge after the battery has been in use for some time.

Accordingly, an object of the invention is to provide a supervisory or monitoring arrangement for the charging current of a storage battery by means of which the change in the battery capacity, dependent upon the number of charge-discharge cycles, is taken into account.

A further object of the invention is to provide a supervisory arrangement of the mentioned type, wherein the rate of operation of an ampere hour counter is automatically changed in accordance with the number of charge-discharge cycles to which the battery has been subjected.

A further object of the invention is to provide a supervisory arrangement of the aforementioned type constructed so that the entire device can be accommodated in a terminal board or assembly which can be attached to the casing for a multi-cell storage battery.

In accordance with the invention, the supervisory device includes a counter driven by the ampere hour measuring device, as well as a counter for the number of charge-discharge cycles to which the battery is subjected. Preferably, means are provided to vary the counting speed of the ampere hour counter in accordance with the number of charge-discharge cycles to which the battery is subjected.

A relatively high resistance potentiometer may be connected in parallel with a current measuring resistance of the ampere hour measuring device, and the adjustable tap of this potentiometer may be used to supply a controllably varied electric potential to the ampere hour measuring device. By such a means, it is possible to correct the indication of the ampere hour measuring device automatically in such a manner that, independent of the age of the battery, there will always be provided an exact indication of the ampere hour capacity available in the battery.

The current measuring resistance of the ampere hour counter may be subdivided into sections by means of a tap. If this is done, the entire measuring resistance may be used to measure the discharge current, while only one section of the resistance is used to measure the charge current, and each of the two partial resistances or resistance sections being connected in parallel with a respective relatively high resistant potentiometer, and with both adjustable potentiometer taps being electrically connected with the ampere hour counter. With an arrangement of this type, the counting speed of the ampere hour counter can be made to vary in dependence on the current direction and, in such a manner, the greater number of ampere hours required for charging may be compensated.

As present-day batteries are usually charged at a constant charging potential, any difference between the charge and discharge potential is negligible. In such instances, no intermediate tap for the current measuring resistance need be provided.

Adjustment of the potentiometer taps can be effected by means of the counter for the number of charge-discharge cycles. Preferably, the coupling between the ampere hour counter and the charge-discharge cycle counter is constructed in such a manner that the charge-discharge cycle counter is advanced by a unit responsive to charging of an amount in excess of an adjustable fraction of the total nominal capacity of the battery. The coupling can also be constructed in such a manner that the charge-discharge counter, or charging cycle counter, is advanced one unit as soon as there is a current reversal from charge to discharge or vice-versa.

Preferably, the supervisory device includes a reduction gearing driven by the motor driving the ampere hour counter or indicator, and this reduction gearing includes a common driving wheel for the ampere hour counter and the charging cycle indicator. The common driving wheel preferably operates two separate shafts, one actuating the ampere hour counter and, at intervals, a counter of the operational or reserve capacity of the battery, while the other shaft actuates the charging cycle counter.

As a specific feature of the invention, the charging cycle counter may include a stepping wheel, such as a ratchet wheel, a switching lever to advance the ratchet wheel, and a blocking lever. The ratchet wheel may be secured to the shaft which drives the charging cycle counter, and the driving pawl may be oscillatable on this shaft while the blocking lever may be oscillatable about another axis. A device driven by the ampere hour counter motor may be provided and include two spring biased arms or levers oscillatably parallel to its plane of rotation. One of these arms or levers engages the driving pawl in one rotational direction of the counter motor and brings this driving pawl into its terminal position in which it is retained by the blocking lever. The other spring biased lever is effective, upon rotation of the counter motor in the opposite direction, to release the switching lever.

For an understanding of the principles of the invention, reference is made to the following description of typical embodiments thereof as illustrated in the accompanying drawings.

In the drawings:

FIGS. 9, 10 and 11 are partial elevation views of a charging cycle counter switching mechanism;

FIG. 14 is a side elevation view of another form of supervisory device embodying the invention;

FIG. 15 is a somewhat schematic elevation view of the charging cycle switching mechanism of the supervisory device shown in FIG. 14;

FIGS. 15a and 15b are enlarged detail views of the switching mechanism of FIG. 15;

FIG. 16 is an elevation view, partly in section, of a counter indicating the total number of ampere hours which have been discharged from the battery; and FIG. 17 is an end elevation view of the counter shown in FIG. 16.

Figure 1:
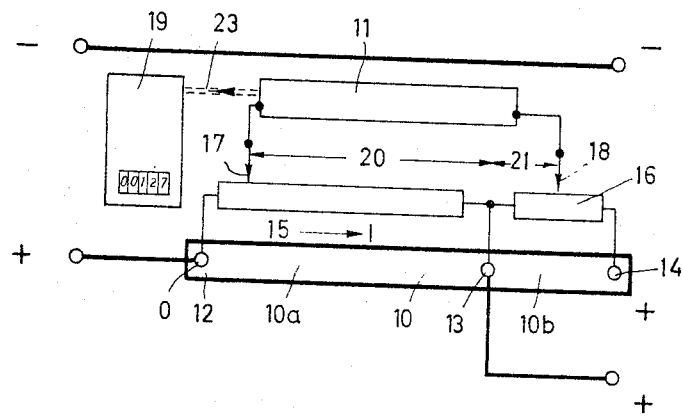
FIG. 1 is a schematic block diagram of the basic arrangement of a supervisory device embodying the invention.

Referring to FIG. 1, a current measuring resistance for an ampere hour counter 11 is illustrated as subdivided into two partial resistances 10a and 10b. However, resistance 10 could also be a single resistance provided with taps, particularly if used with a constant voltage charge in which no gassing takes place and whose charging efficiency is substantially 100%. The two partial resistances 10a and 10b are chosen in such a manner that the ratio $$\frac{10a + 10b}{10a}$$

is equal to the maximum charging factor which can be expected. In lead storage batteries, this factor would be about 1.20.

Current measuring resistance 10 has three terminals 12, 13 and 14. Terminal 12 is connected to one pole of the battery, terminal 13 is connected with one terminal of the charger, and terminal 14 is connected with one load terminal. A pair of series connected relatively high resistance potentiometers are connected in parallel with current measuring resistance 10, and potentiometers 15 and 16 are provided with respective adjustable taps 17 and 18 connected to ampere hour counter 11. By the illustrated means, it is possible to change the potential applied to the ampere hour counter relative to the potential drop across resistance 10 and, at the same time and using the same means, to adjust the counting speed of the ampere hour counter 11. As the number of charging cycles increases, which number is determined by the charging cycle counter 19, the capacity of the battery becomes smaller. This means that the battery will be fully charged at a smaller number of ampere hours, and will be discharged after a smaller number of ampere hour drains. Thus, the sensitivity of the ampere hour counter 11 has to be increased with an increasing number of charging cycles. This is effected by increasing the overall value of the resistance subvalues 20 and 21.

Adjustment of taps 17 and 18 to change the value of the resistances 20 and 21 may be effected manually in accordance with the reading of the charging cycle counter 19. If this is done, the adjustable contacts 17 and 18 may be each associated with a scale or dial so as to be adjusted to the corresponding indication of counter 19.

Figure 2:
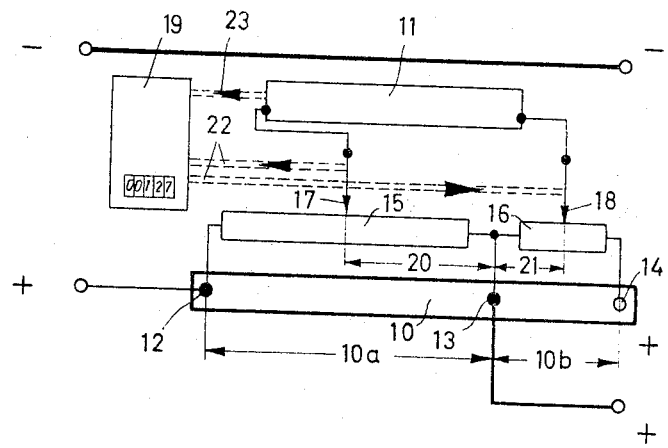
FIG. 2 is a view similar to FIG. 1 illustrating two adjustable potentiometer taps adjustable by a charging cycle counter.

However, FIG. 2 shows an arrangement wherein the adjustment of taps 17 and 18 is effected automatically by counter 19. The couplings for adjusting the taps 17 and 18 of potentiometers 15 and 16, respectively, are illustrated at 22. Otherwise, the arrangement of FIG. 2 corresponds exactly to that of FIG. 1. 23 in FIGS. 1 and 2 illustrates the means coupling the ampere hour counter 11 to the charging cycle counter 19.

Figure 3:
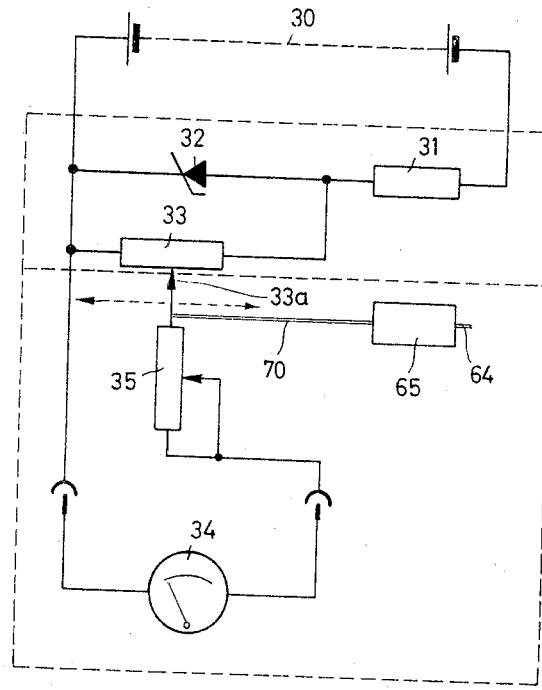
FIG. 3 is a schematic wiring diagram, illustrating a remote indicator useable with a supervisory device and the remote indicator as mounted within a casing forming a battery terminal means.

FIG. 3 illustrates the circuity of the remote indicator for the supervisory device. A storage battery is indicated at 30 as being bridged by a voltage divider comprising a resistance 31 and a zener diode 32 connected in series with each other. A potentiometer 33 is connected in parallel with zener diode 32, and is provided with an adjustable tap 33a. The zener diode serves as a constant voltage reference, and the reference voltage can be varied by adjustment of potentiometer 33. The indicating meter is indicated at 34 as having a variable resistance 35 in series therewith to compensate meter 34.

Adjustment of tap 33a of potentiometer 33 is effected by the ampere hour counter 11 of FIGS. 1 and 2. When battery 30 is charging, adjustable tap 33a is moved toward the right and, when battery 30 is discharging, tap 33a is moved toward the left. In this manner, the tapped voltage of the potentiometer is proportional to the charging condition of the battery and the indicating meter 34 will indicate this charging condition.

In accordance with the recommendations of battery manufacturers, complete discharge of the battery should not be permitted to take place, but the battery should be re-charged when the nominal capacity has dropped to about 20%. Means can be provided which indicate when this lower limit has been reached. For example, a contact may be provided in the meter 34 to be actuated or closed when the nominal capacity reaches 20%. In the same manner, of course, a contact could be provided to be operated when the battery is fully charged. This latter contact could activate an acoustic signal indicating complete charging of the battery. Actuation of such a contact may, for example, also be effected by the adjustable tap 33a of potentiometer 33. Furthermore, the ampere hour counter could be used for controlling the charging of the battery.

In order to avoid the ampere hour counter indicating a further increase in the capacity of the battery after the battery is fully charged, an abutment or stop may be provided to limit the movement of the indicating element such as a dial, pointer, or the like. The indicating element can be driven by means of a slip clutch which will start to slip as soon as the terminal deflection has been reached.

Charging cycle counter 19 of FIGS. 1 and 2 preferably drives a rotary decade counter which can be advanced only in one direction, as may be effected by a free-wheeling device or one-way clutch. The coupling between the ampere hour counter and the charging cycle counter may, for example, be so constructed that one complete charge of the battery will result in a change of substantially one unit in the indication of the charging cycle counter. However, if only partial charging of the battery is effected, then the charging cycle counter will be advanced substantially one unit only when the sum of the partial charging corresponds to one complete charging. It is also possible, however, to construct the transmission so that upon each partial charging in excess of, for example, 40% of the nominal capacity of the battery, the charging cycle counter will be advanced substantially one unit.

Figure 4:
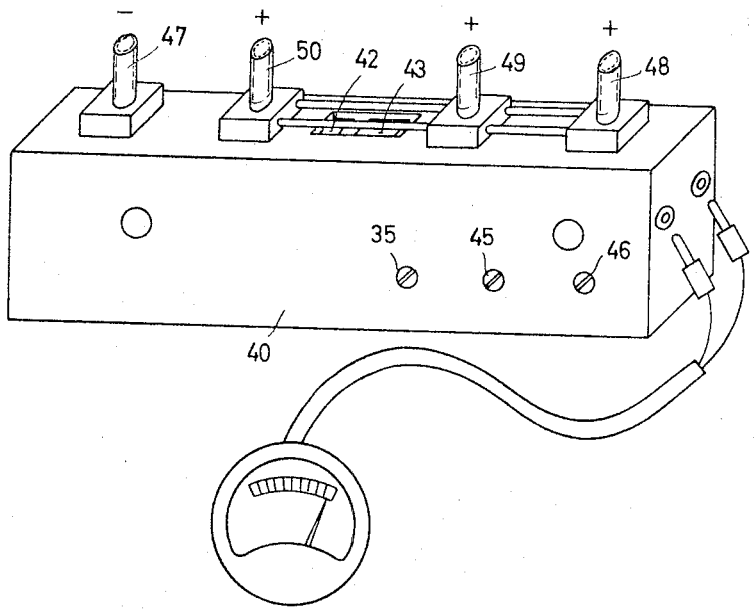
FIG. 4 is a perspective view of the supervisory device and the remote indicator as mounted within a casing forming a battery terminal means.
Figure 5:
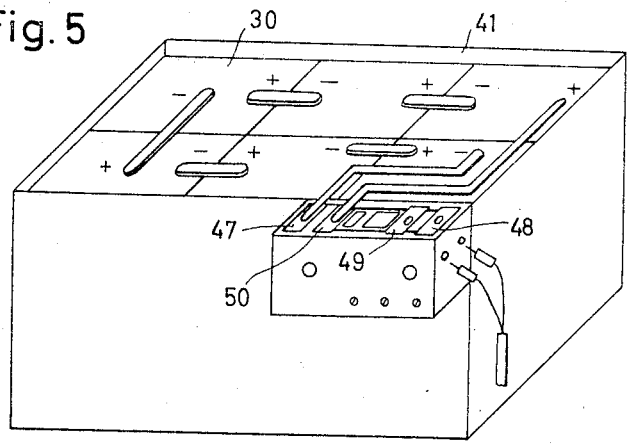
FIG. 5 is a perspective view of a storage battery having the supervisory device and indicator of FIG. 4 mounted on its casing.

FIGS. 4 and 5 illustrate an advantageous housing of the supervisory device. The components of the counting mechanism are mounted within an elongated casing 40 which may be secured to the battery container 41 and constitute a terminal board for the battery. Ampere hour counter 42, charging cycle counter 43, and associated resistances 10, 15, 16, 31, 32, 33, 35, etc. are mounted within casing 40. The resistances can be adjusted by means of set screws 44, 45 and 46. Set screw 44 adjusts the resistance 35 of FIG. 3, and thus adjusts the remote indicating instrument 34. Set screw 45 adjusts the potentiometer 15, or the adjustable tap thereof, while set screw 46 adjusts potentiometer 16 or the adjustable tap 18 thereof. Terminals 47, 48, 49 and 50 are provided on casing 40 and, of these terminals, terminal 48 is connected with the positive terminal of the load, terminal 49 with the positive pole of the battery charger, and terminal 50 with the positive pole of the battery. Terminal 47 is connected with the common negative pole of the battery, the battery charger and the load. As stated, the supervisory device may be connected with the battery container or casing 41, as shown in FIG. 5, and will thus always be in association with the battery, even if the latter is removed.

Figure 7:
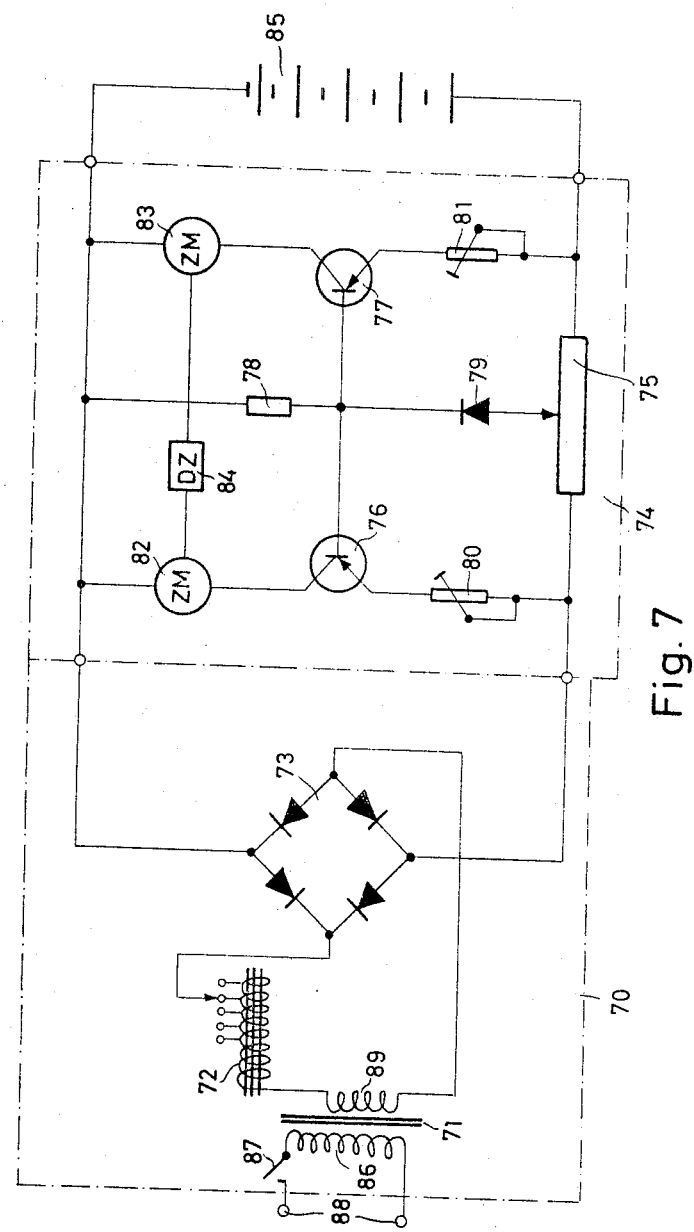
FIG. 7 is a schematic wiring diagram of an ampere hour counter in operative association with a battery charger.

If the supervisory device is used for controlling a battery charger, then a very simple battery charger may be used. For example, the ampere hour counter may drive an arrangement controlling the charging operation of the battery such as, for example a potentiometer controlling a transducer which is connected in the A.-C. circuit of a battery charger, or of a different A.-C. current resistance. FIG. 7, described hereinafter, illustrates an electric ampere hour counter in operative association with a battery charger, but ampere hour counters involving motor driven counters may also be used.

Figure 6:
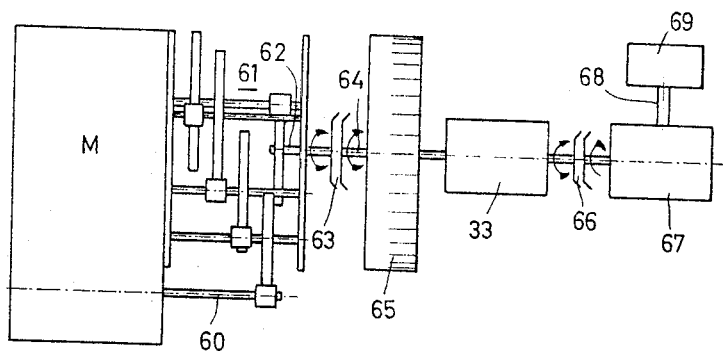
FIG. 6 is a somewhat schematic side elevation view of driving means for the potentiometer of the supervisory device.

FIG. 6 diagrammatically illustrates a practical embodiment of the driving means for adjusting potentiometers 15 and 16 as well as for driving charging cycle counter 19 from ampere hour counter 11. Measuring motor M of ampere hour counter 11 has an output shaft 60 which, through gearing 61, drives a shaft 62 connected by a slip clutch 63 to a shaft 64 coaxial with shaft 63. Shaft 64 carries the indicating drum 65 of the ampere hour counter. The indicated value of the ampere hour counter may, for example, be read at a stationary mark associated with drum 65.

Slip clutch 63 is so constructed that, when the driving torque exceeds a predetermined value, in either direction, the clutch 63 will slip. Thus, indicator drum 65 may carry a pin (not shown) which in the terminal positions of the indicator drum bears against a stationary abutment. Indicator drum 65 will thus remain stationary while measuring motor M continues to run. While potentiometer 33 is illustrated as rigidly coupled with drum 65, the coupling could also be effected by means of a suitable transmission or gearing.

Charging cycle counter 67 is driven by means of a freewheeling device, or one-way clutch, 66 connected to the end of shaft 64 opposite to that end associated with slip clutch 63. The free-wheeling device 66 assures that counter 67 is advanced in one direction only in spite of the alternate rotational directions of indicator drum 65.

Potentiometers 15 and 16 are driven by counter 67 through shaft 68, these potentiometers being mounted within a casing 60. Potentiometers 15 and 16, through their adjustable taps 17 and 18, respectively, are adjusted upon an increase in the charge cycle number in such a manner that the indicating sensitivity in the ampere hour counter is gradually increased. Thus, with an increasing number of charging cycles of the battery, a complete charging or discharging indicated by the ampere hour counter, corresponds to the decreasing capacity of the battery.

Referring to FIG. 7, a battery charger 70 is illustrated as including a transformer 71, a charging current control winding 72 provided with several taps, and a full wave rectifier 73. Primary winding 86 of transformer 71 is connected to the supply mains through a switch 87. The control winding 72 and the rectifier 73 are connected in series with secondary winding 89 of transformer 71.

An ampere hour counter 74 is indicated as employing transistors, but it should be understood that ampere hour counters of different construction may be used. The operation of counter 74 is as follows. Current flowing through resistance 75 effects a voltage drop across this resistance, and this voltage drop is applied to transistors 76 and 77 for control purposes. By means of a voltage divider comprising resistance 78 and diode 79, the base-emitter circuits of transistors 76 and 77 have a constant bias voltage applied thereto and which is independent of changes in the load. Emitter resistances 80 and 81, preferably constructed as potentiometers, are inserted in the emitter circuits of the transistors.

The voltage at diode 79 is higher than the input voltage threshold value of transistors 76 and 77, and the triggering voltage of the transistors can be set by means of resistances 80 and 81 since the transistors cannot be controlled by a constant voltage. The control of transistors 76 and 77 is effected in such a manner that the voltage drop across resistance 75 due to current flow therethrough is added to the voltages at diode 79 and at the emitter resistances 80 and 81, or is subtracted from the voltage at diode 79 and emitter resistances 80 and 81, respectively. The output circuits of transistors 76 and 77 include the counter motors 82 and 83, or other arrangements for forming a current-time integral, and which counter motors are actuated by the collector current of transistors 76 and 77.

The two counter motors 82 and 83, or any other integration devices, operate a differential counter 84 which measures the difference between the indications of the counter motors 82 and 83. The indication of differential counter 84 is a measure of the quantity of current which has passed through the ampere hour counter 74, and therefore is also a measure of the quantity of current which has been stored by battery 85. The circuit is so constructed that upon current flow from charger 70 to battery 85, the differential counter will advance or add, while it will retract or subtract upon current flow in the reverse direction.

This means that, during charging of battery 85, counter 84 is actuated by motors 82 and 83. Counter 84 may be so constructed that, upon a predetermined charging of, for example, 80% of the fully charged condition of the battery, a change in the connections at the control winding 72 is effected so that the charging current will be decreased. Counter 84 may also effect several adjustments at different indication values so that the charging current of battery 85 can be decreased in a stepwise manner. It is also possible to have counter 84 drive a potentiometer controlling the current flow through a control winding of a transducer, such as a magnetic amplifier, which may be used in place of control winding 72, and in this manner a constant or modulating variation of the charging counter can be effected. Counter 84 could also be used to actuate switch 75 so that, after a predetermined charging of battery 85, the battery charger is disconnected from the means.

Figure 8:
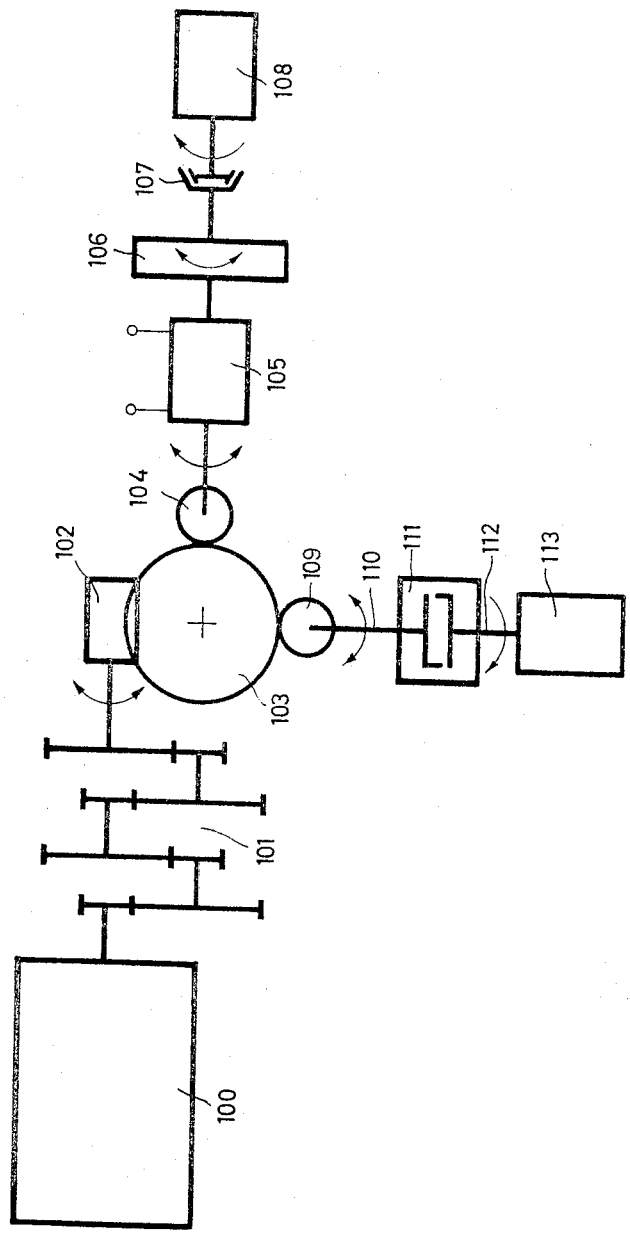
FIG. 8 is a schematic diagram of another embodiment of a supervisory device in accordance with the invention, and including an ampere hour counter driven by a counter motor as well as mechanism for measuring the available capacity of the battery and a charging cycle counter.

FIG. 8 illustrates a modified form of supervisory device embodying the invention. The rotor of the counter motor is indicated at 100 as driving a worm wheel 103 through reduction gearing 101 and a worm 102. Through a spiral gear 104, worm wheel 103 drives a potentiometer 105 for a remote indicating instrument of the type shown in FIG. 3, this indicating instrument having a dial, scale disc, or drum 106 for direct reading of the available ampere hour capacity of the battery. A counter 107 indicating the number of ampere hours discharged from the battery is driven by a slip coupling 107 in only a single direction. Counter 108 is driven only when the battery is discharging, and it is not driven when the battery is charging. The counter 108 will thus indicate the total number of ampere hours which have been drained from the battery during its life.

Through another spiral gear 109 and a shaft 110, worm wheel 103 drives a charging cycle switching mechanism 111 explained in detail with reference to FIGS. 9–12. The output shaft 112 of mechanism 111 drives a counter 113 whenever there is a change in the direction of current flow, as when there is a transition from charging to discharging, or vice-versa. Such an indication is provided in view of the fact that the life of a battery depends to a very large extent upon the number of charging cycles, without reference to what extent the battery has been discharged.

In FIGS. 9–12, the input shaft of switching mechanism 111 is indicated at 110 and the output shaft at 112. Through a spiral gear 122, shaft 112 drives another spiral gear 113 actuating a charge cycle counter. A switching device, such as a ratchet wheel 117, is secured to rotate with shaft 112, and a ratchet switching lever is oscillatably mounted on shaft 112. Lever 119 comprises a portion 119a oscillatably mounted on shaft 112 and cams 119b and 119c. At one end, lever 119 carries a spring loaded switching pawl 119e oscillatable about a pin 119d and engageable with ratchet wheel 117. Lever 119 is biased by a spring (not shown) which biases the lever to the position shown in FIG. 9.

Figure 10:
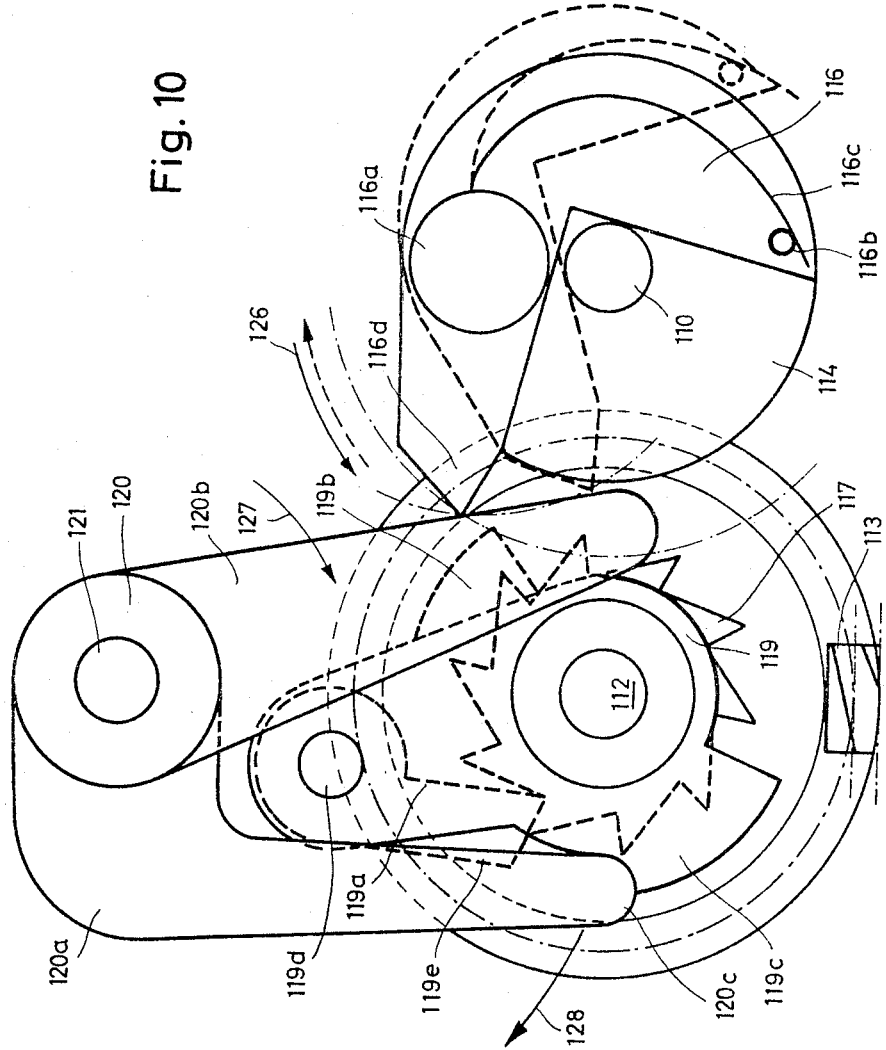
Figure 12:
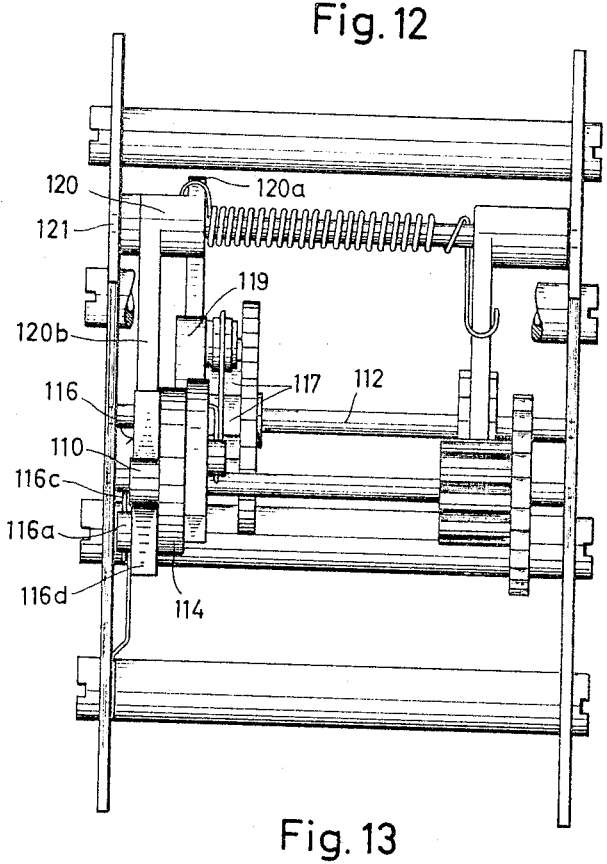
FIG. 12 is an end elevation view of the mechanism shown in FIGS. 9, 10 and 11.

Lever 119 can be swung to the position of FIG. 10 in which it is latched by a blocking lever 120 oscillatable about an axle 121. Lever 120 has arms 120a and 120b. If lever 119 is moved into the position of FIG. 10, then arm 120a has its free end 120c engage cam 119c of lever 119 to hold the latter in this position.

A latching ratchet 118 is secured to shaft 112, as shown in FIG. 11, and a blocking lever 123 is engageable with latching ratchet 118, lever 123 being oscillatable on an axle 121. Lever 123 prevents reverse rotation of shaft 112. Levers 120 and 123 are biased by means of a spring (not shown) surrounding the common axle 121 and having its opposite ends engaged with levers 120 and 123.

Shaft 110 is driven by the counter motor and has a disc 114 secured thereto. On one side of the disc 114 there is a lever 115 oscillatable about a screw 115a. Screw 115a also mounts a spring 115c engaging a pin 115b and thus tends to urge lever 119 to the position shown in full lines in FIG. 9. On the other side of disc 114, a lever 116 is mounted so as to be oscillatable about a screw 116a as best seen in FIG. 10. Screw 116a carries a spring 116c which bears against pin 116b and tends to urge lever 116 into the full line position of FIG. 10.

Figure 9:
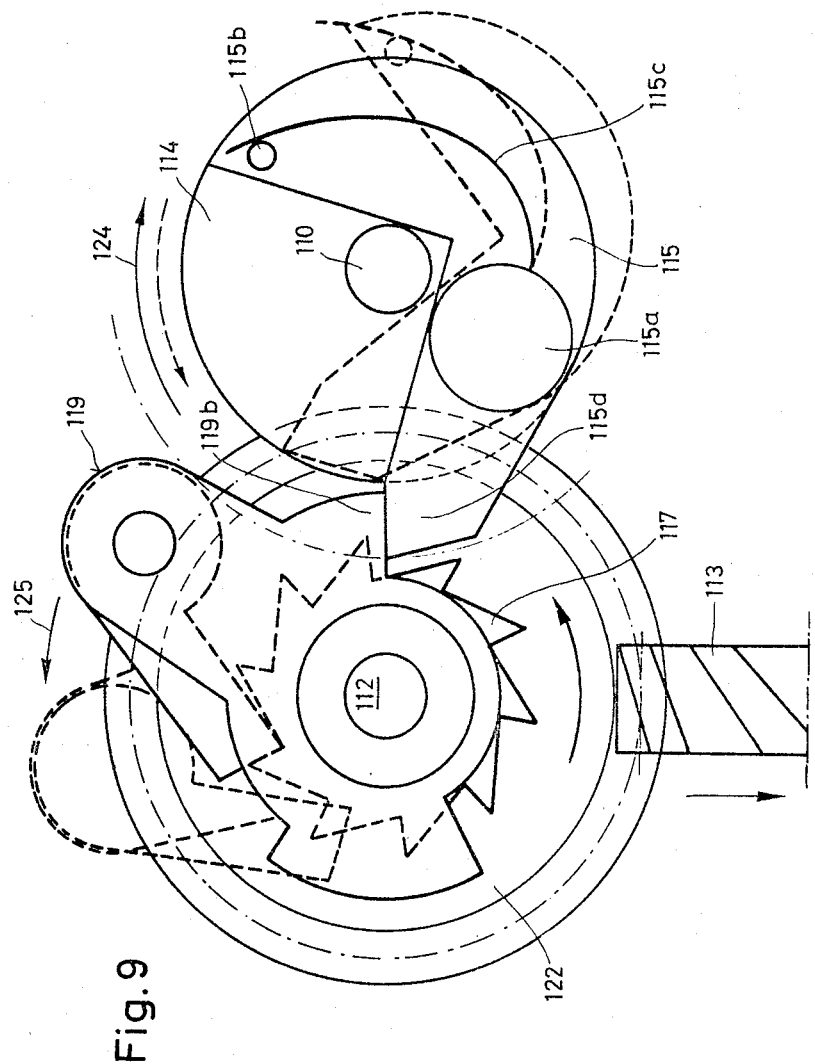

Upon rotation of shaft 110 in the direction indicated by the full-line arrow 124 of FIG. 9, the nose 115d of lever 115 engages cam 119b of lever 119 and turns lever 119 about its oscillatable mounting on shaft 112. Thereby ratchet 117 is rotated in the direction of the arrow 125 of FIG. 9. Lever 119 then occupies the dotted-line position of FIG. 9. In this position of lever 119, end 120c of lever 120 engages cam 119c of lever 119 and latches the latter in this position as shown in FIG. 10. Upon further rotation of shaft 110 in the direction of arrow 124 of FIG. 9, nose 115d of lever 115 touches cam 119b of lever 119 only lightly upon each rotation, so that no further rotation of ratchet 117 is effected.

If the direction of rotation of the counter motor of FIG. 8 is reversed, as would occur upon a change from a battery charging condition to a battery discharging condition, or vice-versa, then shaft 110 is rotated in the direction of arrow 126 of FIG. 10. When shaft 110 rotates in the direction of arrow 126, nose 116d of lever 116 engages arm 120b of blocking lever 120 and drops the latter in the direction of the arrow 127 of FIG. 10. Correspondingly, arm 120a of blocking lever 120 is moved in the direction of the arrow 128 of FIG. 10 so that end 120c disengages cam 119c of lever 119. As lever 119 is thus disengaged, a spring (not shown) biases the lever 119 to the position shown in full lines in FIG. 9. During further rotation of shaft 110 in the direction of arrow 126, nose 116d of lever 116 touches arm 120b of lever 120 only to a slight extent so that there is no further effective actuation of this lever.

From the foregoing description it will be clear that stepping of bracket 107, and thus rotation of spiral gear 113, is effected only upon a reversal in the direction of rotation of shaft 110. That is, such further stepping is effected only when shaft 110 is reversed so that it no longer rotates in the direction of arrow 126 of FIG. 10 but rather in the direction of arrow 124 of FIG. 9. By the described arrangement, the charging cycle counter 113 is advanced, each reversal, by one unit.

Figure 13:
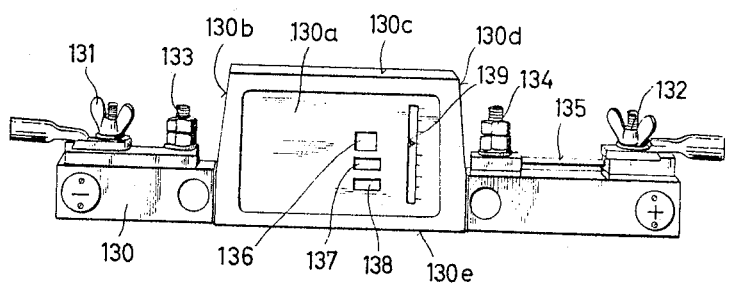
FIG. 13 is a perspective view of another form of battery terminal board serving as a housing for the supervisory device.

FIG. 13 illustrates an alternative embodiment of a terminal board for a storage battery which also serves for supporting the supervisory device of the invention. Terminal board 130 has terminals 131 and 132, at each end, for the charge and discharge cables of the storage battery. Terminals 133 and 134 are connected to the output terminals of the storage battery. The measuring resistance for the ampere hour counter is indicated at 135 as extending between terminal 132 and terminal 134. The terminal board 130 has a central raised portion 130a in which is mounted the entire supervisory device including counters 136, 137 and 138 as well as the drive means for these counters and also the measuring motor. Referring to FIG. 13, 136 is the indicating counter for the number of ampere hours available from the battery, 138 is the indicating counter for the total number of ampere hours which have been discharged from the battery, and 137 is an indicator counter for the number of charging cycles.

Raised portion 130a of terminal board 130 houses a potentiometer connected in parallel with measuring resistance 135 and which, as in the manner previously described, may be adjusted either manually or automatically in dependence upon the number of charging cycles. The setting of the potentiometer, which latter is the same as the potentiometer 20 of FIGS. 1 and 2, is made visible by means of indicator device 139.

The counter motor may be so arranged within portion 130a of terminal board 130 that its rotor is supported in the vicinity of the upright side 130b. This counter motor may have a U-shaped permanent field magnet which extends substantially along the edges 130c, 130d and 130e of the raised portion and thus embraces the couplings and the counter devices as well as all of the components of the supervisory device. By this arrangement, a compact space arrangement is provided. The coupling members preferably are made of non-magnetic material, for example, brass. In order to prevent excessive wear, particularly of the cams and the pawls, the latter are preferably coated with a hard chrome layer.

FIG. 14 illustrates another embodiment of the supervisory device in which the counter motor 200 drives an output pinion 201 meshing with a gear wheel 202. Through a coaxial worm 203, gear wheel 202 drives worm wheel 204 secured to a shaft 205 having a worm 206 formed thereon or driven thereby. Worm 206 drives a worm wheel 207 on a shaft 208 to which is secured a worm 209. Worm 209, through a worm wheel 210, adjusts or drives a potentiometer 211. Worm 209 also drives a worm wheel 212 secured to a shaft driving a counter 213 for indicating the total ampere hour drain from the battery.

On the shaft 208 there is secured a worm 220 which has not been shown in detail in FIG. 14. However, and referring to FIGS. 15 and 15a, worm 220 drives a switching wheel 221 for the cycle switching mechanism. Switching wheel 221 is held in the position shown in FIG. 15a by means of a bowed spring 222 engaging an arcuate recess in the wheel 221. Upon rotation of shaft 208 and thus of worm 220, wheel 221 is angularly displaced from its rest position through an angle of about 30°, dependent upon the direction of rotation of shaft 208 and worm 220. The angular displacement of wheel 221 is limited due to the fact that this wheel has only two teeth engaging worm 220. Wheel 221 is fixed to a bushing 223 which is oscillatably mounted and has an arm 223a. The outer end of arm 223a has mounted therein a screw 224 which serves as an oscillatable mounting for a blocking pawl 225. Blocking pawl 225 cooperates with a ratchet wheel 226 driving the counter device 227. A blocking pawl 228, biased by a spring 229, prevents reverse rotation of ratchet wheel 226. All of this may be seen in FIGS. 15 and 15b.

FIG. 16 illustrates the driving means for a counter for the total number of ampere hours discharged from the battery. The gear wheel 212 of FIG. 14 is secured on a bushing 230 which is rotatably mounted on a shaft 231. At its right-hand end, as seen in FIG. 16, shaft 231 has a rectangular, and preferably square, section 231a having a non-rotatable fit within an element 232. Element 232 and bushing 230 have their opposing surfaces formed with gear teeth 233, and element 232 is biased, to engage the gear teeth 233, by means of a coil spring 234. Shaft 230 also has secured thereto a gear wheel 235 whose teeth are engaged by a spring 236. Gear 235 and spring 236 prevent back rotation of the counter.

Upon counterclockwise rotation of shaft 230 in the direction of 237 of FIG. 17, element 232 is driven by the gearing 233. Through the rectangular portion 230a of shaft 231, this drives the counter 213. Upon rotation in the opposite direction, the blocking arrangement, including gear 235 and spring 236, prevents rotation of shaft 231, with element 232 being moved to the right, against the bias of coil spring 234, by the teeth of gearing 233 sliding over each other.

While specific embodiments of the invention have been shown and described in detail to illustrate the application of the principles of the invention, it will be apparent that the invention may be embodied otherwise without departing from such principles.

The embodiments of the invention in which an exclusive property or privilege is claimed are defined as follows:

1. In combination with an electric storage battery, having a nominal capacity, and an electric charger therefor: supervisory means comprising an ampere hour measuring means electrically connected to said battery to measure the state of charge thereof; a first counter operable by said measuring means; and a second counter operatively associated with said measuring means to count the charging cycles of said battery.

2. Electric storage battery charging current supervisory means, as claimed in claim 1, said ampere hour measuring means having a variable speed; and means operable by said second counter to adjust the speed of said ampere hour measuring means in accordance with the number of charging cycles of said battery.

3. Electric storage battery charging current supervisory means, as claimed in claim 2, said ampere hour measuring means including a battery current measuring resistance; said speed adjusting means including a relatively high resistance potentiometer connected in parallel with said current measuring resistance and electrically connected to said first counter to adjust the speed thereof.

4. Electric storage battery charging current supervisory means, as claimed in claim 3, said current measuring resistance including a pair of terminals and an intermediate tap; the entire measuring resistance being used to measure the discharge current of said battery, and the portion of said resistance between said intermediate tap and one terminal being used to measure the charging current of said battery; said potentiometer means including a pair of relatively high resistance potentiometers each connected in parallel with the respective sections of said resistance; and means connecting the adjustable taps of said potentiometers to said first counter.

5. Electric storage battery charging current supervisory means, as claimed in claim 4, including driving means connecting said second counter to the adjustable taps of said potentiometers.

6. Electric storage battery charging current supervisory means, as claimed in claim 1, said first counter including an indicator and a motor driving said indicator; said indicator having a limited movement; and a slip coupling interconnecting said motor and said indicator.

7. Electric storage battery charging current supervisory means, as claimed in claim 1, including driving means connecting said first counter to said second counter to drive said second counter from said first counter; said driving means advancing said second counter substantially one indicating unit responsive to said first counter measuring a selected fraction of the nominal capacity of said storage battery.

8. Electric storage battery charging current supervisory means, as claimed in claim 1, said first counter including a driving motor and an indicator operated by said driving motor; reduction gearing connecting said motor to said indicator; a driving component included in said reduction gearing; means connecting said driving component to said second counter; an available battery capacity indicator; and means connecting said driving component to said available battery capacity indicator.

9. Electric storage battery charging current supervisory means, as claimed in claim 8, including first and second shafts operated by said driving component; said first shaft being operatively connected to said first counter and to said available battery capacity indicator; said second shaft being operatively connected to said second counter.

10. Electric storage battery charging current supervisory means, as claimed in claim 9, said second shaft including an input shaft section and an output shaft section; a ratchet wheel fixed to said output shaft section to drive said second counter; a switching lever oscillatably mounted on said output shaft section and operative to drive said ratchet wheel; an oscillatably mounted blocking lever operatively associated with said switching lever to latch the same at one limit of its movement; a support secured to said input shaft section; first and second levers oscillatably mounted on said support and oscillatable parallel to the plane of movement of said support; spring biasing means associated with said first and second levers; said first lever, in one direction of rotation of said input shaft section, engaging said switching lever and moving the latter to said one limit of movement in which said switching lever is latched by said blocking lever; said second lever engaging said blocking lever, upon rotation of said input shaft section in the opposite direction to actuate said blocking lever to release said switching lever.

11. Electric storage battery charging current supervisory means, as claimed in claim 10, including a pawl oscillatably mounted on the free end of said switching lever and engageable with said ratchet.

12. Electric storage battery charging current supervisory means, as claimed in claim 10, including a second ratchet wheel secured to said output shaft section; a spring biased pawl engageable with said second ratchet wheel and effective, in cooperation therewith, to inhibit reverse rotation of said first-mentioned ratchet wheel; and means oscillatably mounting said pawl for oscillation about the axis of oscillation of said blocking lever.

13. Electric storage battery charging current supervisory means, as claimed in claim 1, including a casing for said battery; a housing constituting a terminal board, the components of said supervisory means being mounted in said housing; said housing being mounted on said casing and having connecting terminals for said battery, said charger, and the load.

14. Electric storage battery charging current supervisory means, as claimed in claim 13, said first counter including an indicator and a driving motor for said indicator; said driving motor having a substantially U-shaped field magnet embracing the individual components of said supervisory means.

15. Electric storage battery charging current supervisory means, as claimed in claim 2, the driving means connecting said first counter to said second counter including a one-way clutch whereby said second counter is operated in one direction only.

16. Electric storage battery charging current supervisory means, as claimed in claim 1, including control means for said electric charger; and means connecting said ampere hour measuring means to said control means to control said electric charger.

17. Electric storage battery charging current supervisory means, as claimed in claim 16, in which said control means comprises a transducer included in said electric charger and a potentiometer controlling said transducer; said ampere hour measuring means adjusting said potentiometer.

18. Electric storage battery charging current supervisory means, as claimed in claim 8, in which said driving component comprises a gear; a shaft to which said gear is fixed; a pair of worms on said shaft; and a pair of worm wheels each meshing with a respective worm; one of said worm wheels driving said first counter and said available battery capacity indicator, and the other worm wheel driving said charging cycle counter.

19. An electric storage battery charging current supervisory means, as claimed in claim 18, including a ratchet fixed to rotate with the worm gear driving said charging cycle counter; a shaft fixedly mounting said ratchet wheel; a bushing oscillatably mounted on said shaft; an arm extending radially from said bushing; a pawl oscillatably mounted on said arm and engageable with said ratchet wheel to advance the same; a gear wheel secured to said bushing for oscillation therewith, said gear wheel having teeth on only a minor angle of its circumference; and a worm secured on the shaft to which said driving gear is fixed and engageable with the teeth of said gear wheel.

20. Electric storage battery charging current supervisory means, as claimed in claim 9, including a counter for the total ampere hours discharged from said battery; a driving shaft for said counter; a sleeve rotatably mounted on said driving shaft; a worm on said second shaft; a worm wheel secured to said sleeve and meshing with said worm; and a one-way clutch including a first clutch element secured to said driving shaft for rotation therewith and a second clutch element secured to said sleeve for rotation thereof; said clutch elements driving said driving shaft upon rotation of said second shaft in one direction, and slipping over each other while said driving shaft remains stationary during rotation of said second shaft in the opposite direction.

References Cited by the Examiner

UNITED STATES PATENTS 2,899,635   8/1959   Yardney _____ 136—182 X
3,116,451  12/1963   Hatterschide _____ 320—48 X JOHN F. COUCH, *Primary Examiner.*

LLOYD McCOLLUM, *Examiner.*

S. WEINBERG, *Assistant Examiner.*